United States Patent [19]

Brown

[11] 4,184,372
[45] Jan. 22, 1980

[54] PARTICLE DETECTION SYSTEM AND APPARATUS THEREFOR

[75] Inventor: Jack M. Brown, Costa Mesa, Calif.
[73] Assignee: B and W Engineering Services, Costa Mesa, Calif.
[21] Appl. No.: 847,397
[22] Filed: Oct. 31, 1977
[51] Int. Cl.² ............... G01D 21/04; G01M 7/00
[52] U.S. Cl. .......................... 73/572; 73/12
[58] Field of Search ............... 73/52, 572, 12

[56] References Cited

U.S. PATENT DOCUMENTS

| | | | |
|---|---|---|---|
| 2,418,437 | 4/1947 | Vogt | 73/662 X |
| 3,534,588 | 10/1970 | Schulz | 73/572 |
| 3,681,976 | 8/1972 | Schulz | 73/572 |

*Primary Examiner*—James J. Gill
*Attorney, Agent, or Firm*—Harvey C. Nienow

[57] ABSTRACT

A particle detection system for detecting the presence of a particle within a sealed enclosure. It includes a vibrator or shaker whereon is mounted an electromechanical shocking apparatus whereby an operator-actuated switch causes an armature to provide a physical or mechanical shock to the enclosure. A transducer is employed to sense the noise created by a particle within the enclosure striking a side wall thereof, and suitable indicating means are connected in circuit with such transducer to afford visual and audible indications of the presence of the particle. Means is provided for muting the indicators whenever the enclosure is shocked by the armature to prevent the indicators from responding to the noise created by such shocking.

6 Claims, 4 Drawing Figures

PARTICLE DETECTION SYSTEM AND APPARATUS THEREFOR

The present invention relates generally to particle detection systems, but more particularly to such systems and apparatuses used therein for ensuring that a particle within a sealed enclosure under test does not remain undetected, and that overtesting does not result.

Within the past three or four decades, man's activities, most notably space travel and the like, have become increasingly dependent upon the function and performance of many different types and kinds of instruments and devices. For instance, to support human life while out of the earth's atmosphere during space travel or high-speed, supersonic air travel, it is absolutely mandatory that certain devices and instruments function precisely as planned without interruption of any kind.

To enable such highly scientific activities to take place, greater dependence and reliance has been placed on electronic circuitry and devices due to the need for miniaturization, a feature which is most easily and effectively provided through the use of modern-day electronic devices and circuits.

It has been discovered on many occasions, that dust particles or other types of impurities can easily cause an electronic component or a mechanical component to malfunction or to become inoperative, thus creating a potentially catastrophic set of conditions. Since electronic circuitry is most heavily relied upon to perform or control various functions in space travel and the like, impurities within relay enclosures or housings for other types of electronic devices have been particularly noticeable. It has therefore been an objective of various private as well as governmental groups and individuals to provide means for ensuring that devices which are ultimately housed within a sealed enclosure are free of any and all foreign particles such as dust and the like. Attempts have been made to provide testing equipment or apparatus wherein each device is tested to determine if any such foreign particles are present within the enclosure after the particular electronic device has been installed therewithin. Such prior test equipment has utilized vibrating machines of one type or another and noise detectors for sensing the noise which a dust particle or the like will make when it strikes a wall of the enclosure under test.

It is an object of the present invention to provide a particle detection system and apparatus therefor to ensure that substantially any and all particles within an enclosure under test are detected, but wherein overtesting does not result.

A further object of the present invention is to provide a particle detection system and apparatus therefor as characterized above wherein the testing forces and functions are scientifically controlled to ensure that a test is always accurate and that the device or enclosure is not in any way harmed.

A still further object of the present invention is to provide a particle detection system and apparatus therefor as characterized above wherein an automatic striking apparatus is employed for periodically striking, as desired, the enclosure during vibration testing, to dislodge any and all particles within the enclosure.

An even further object of the present invention is to provide a particle detection system and apparatus therefor as characterized above wherein various types of readout devices are employed for providing visual and audible indication of the presence of a particle within an enclosure being tested.

A still further object of the present invention is to provide a particle detection system and apparatus therefor as characterized above wherein the readout equipment is capable of distinguishing between indications afforded by foreign matter and indications afforded by certain components of the test equipment.

A still further object of the present invention is to provide a particle detection system and apparatus therefor as characterized above which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
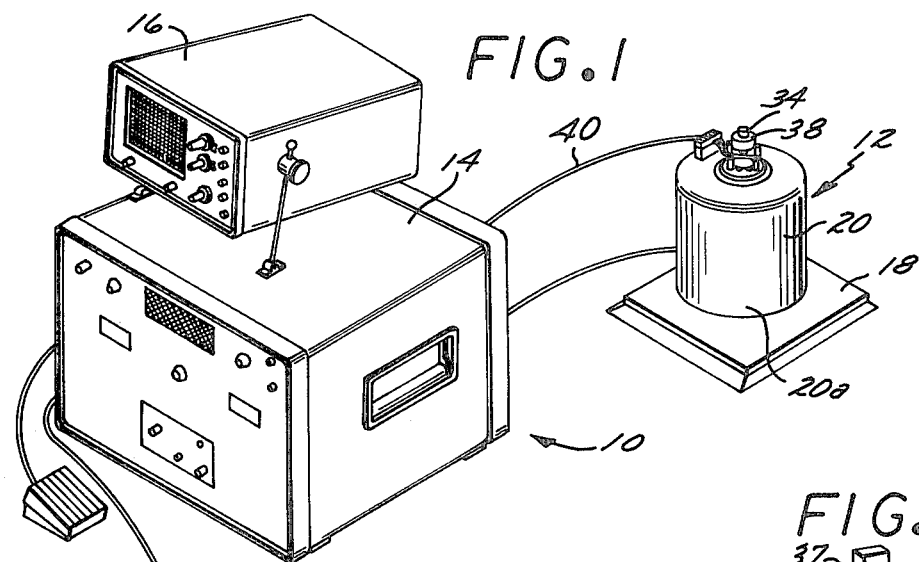
FIG. 1 is a perspective view of a particle detection system according to the present invention.

Referring to FIG. 1 of the drawings, there is shown therein a particle detection system 10 according to the present invention. It comprises a sensor unit 12 connected, as will be hereinafter described, to a console 14 having an oscilloscope 16. The sensor unit 12 is mounted on an isolation base 18 the purpose of which is to substantially isolate vibrations which occur in the sensor unit from the surrounding environment.

The sensor unit 12 comprises a shaker or vibrator 20 which is standard in the industry and which provides up to 20 g sine vibration at between 40 and 250 hertz.

Figure 2:
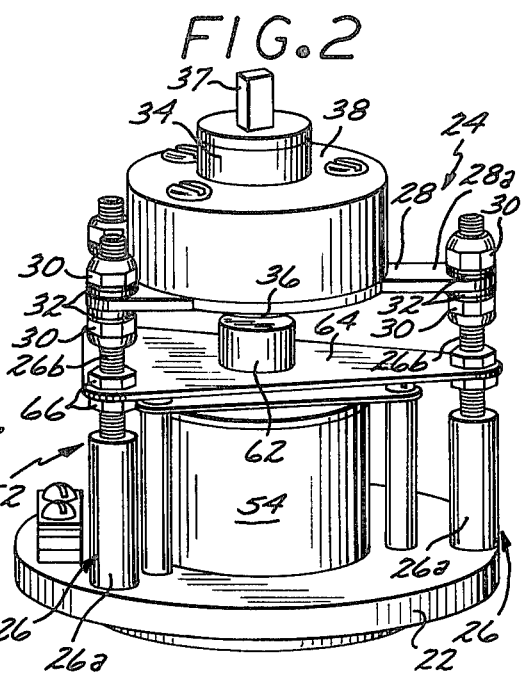
FIG. 2 is a perspective view of shock means employed in the system of FIG. 1.
Figure 3:
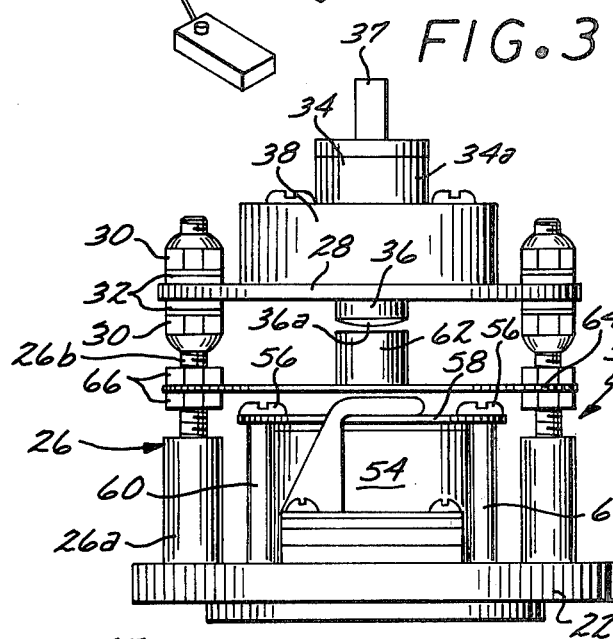
FIG. 3 is a side elevational view of the shock means of FIG. 2.

As shown most particularly in FIGS. 2 and 3 of the drawings, mounted on the shaker 20 is a platform 22 which is associated with the armature within the enclosure 20a.

Mounted on platform 22 is a support frame 24 comprising three equally spaced support posts 26 on the platform. Each of posts 26 comprises a sleeve 26a which is firmly secured to the platform in any appropriate manner as by welding, brazing or the use of appropriate fasteners. A stud 26b is threadedly mounted in each of the sleeves 26a, as shown in FIGS. 2 and 3.

Mounted on posts 26 is a triangularly-shaped support member 28 having three support arms or extensions 28a each of which is provided with a through opening for receiving the threaded stud 26b. To securely anchor support member 28 relative to platform 22, suitable mounting nuts 30 are provided on each stud 26b on either side of each support arm 28a, and suitable resilient or rubber grommets or washers 32 are interposed between each side of arm 28a and the adjacent mounting nut 30. In this way, the support member 28 is firmly secured relative to the platform 22 but resiliently so by virtue of the resilient washers 32.

A transducer 34 is firmly secured to mounting member 28 by means of a hold-down screw and anvil 36.

Such hold-down screw 36 is formed with a threaded extension (not shown) which extends through a hole centrally located in the support member 28 and which threadedly engages the bottom wall of an enclosure 34a for the transducer 34. Member 36 is formed with a frusto-spherical surface 36a to receive hammer blows as will hereinafter be explained.

Mounted on transducer 34 in any appropriate manner is the device under test such as represented by the enclosure 37 shown in FIGS. 1, 2, 3 and 4 of the drawings. Enclosure 37 as will be readily understood by those persons skilled in the art, may be the housing for a relay or any other device whose immediate atmosphere must be absolutely clean and free of any foreign particles such as dust, solder, flux and the like.

Under the aforedescribed conditions, namely with the device or enclosure 37 firmly secured to the transducer 34, and with the latter secured relative to platform 22 through the support member 28 and tripod support means 24, the vibration afforded by the shaker 20 is transmitted to the enclosure 37. Most particles within enclosure 37 are thereby caused to have a random path of movement within the enclosure, striking against the bottom, top or side walls thereof. The noise generated by such particles striking the enclosure 37 is detected by the transducer 34 and, following suitable amplification, corresponding signals are conducted through appropriate lead wires 40 to the console 14 to provide both audible and visual displays as will hereinafter appear in greater detail.

The noise signal generated by the transducer 34 is amplified by an amplifier 38 which is toroidally-shaped to be mounted around transducer 34 on support member 28. Amplifier 38 is a potted assembly and provides a signal which is ultimately transmitted to an ultrasonic amplifier 42. Connected to such amplifier is a speaker, also represented by the box 42, whereby an audible indication is afforded of the fact that the transducer 34 has detected a loose particle within the enclosure 38 under test.

Figure 4:
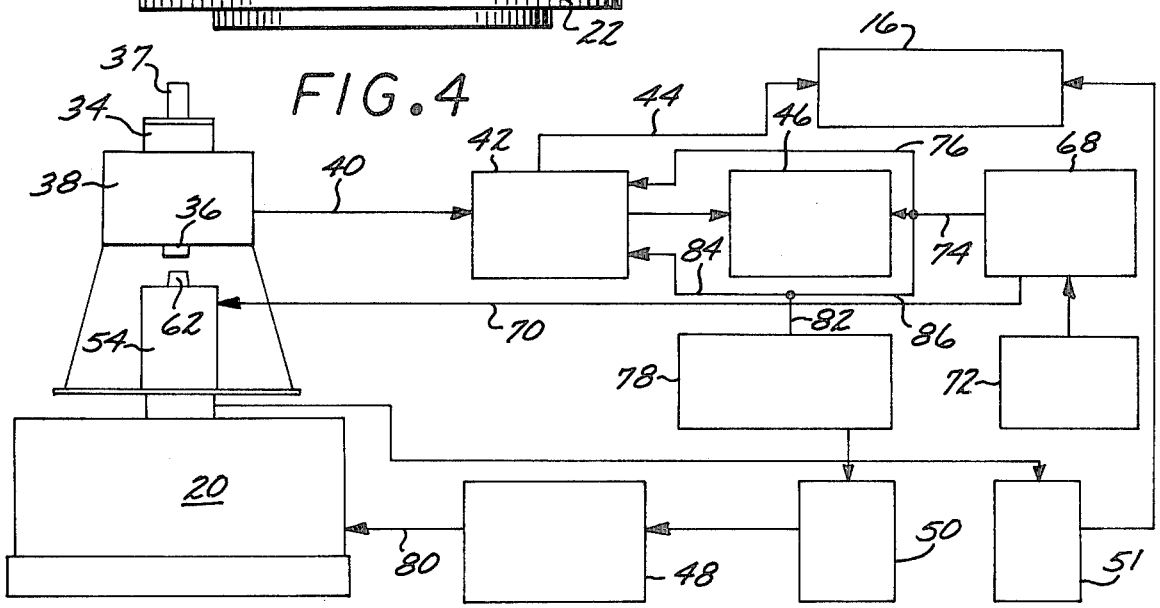
FIG. 4 is a schematic showing of the shock means and a block diagram of components associated therewith to provide the system.

After suitable amplification of such signal from transducer 34, a signal is provided to the oscilloscope 16 through suitable lead wires 44 shown in FIG. 4. The oscilloscope thus provides, in the usual manner, a visual indication of the presence of a particle within the enclosure 37.

At the same time that the oscilloscope 16 is afforded a signal from amplifier 42, a threshold detector 46 is afforded a corresponding signal. Threshold detector 46 comprises an indicator lamp and suitable circuitry whereby as soon as a minimum signal level or threshold is exceeded, the lamp is energized and remains energized until manually reset.

As seen in FIG. 4 of the drawings, the shaker 20 is afforded power from a power amplifier 48 and a frequency adjustment device 50, and a signal from the shaker is applied to the oscilloscope 16 through an amplifier 51.

Thus, it is seen that the necessary circuits are provided for energizing the shaker 20 so as to cause the device under test or enclosure 37 to vibrate and thereby enable the transducer 34 to sense the presence of any loose particles within the enclosure 38 and to provide a signal to a speaker, the oscilloscope 16 and a threshold detector 46.

Frequently, particles within an enclosure such as that shown at 37 will become lodged in certain locations, as between different elements of a switch or other electronic component. Frequently, the parts or elements of such electronic components are of such a nature that a particle can easily become lodged or trapped, thereby not responding to the action of the shaker 20.

Heretofore, copper rods were used to manually strike the enclosure 37 to try to dislodge such particles. Such copper rods were wielded by the operator of the test apparatus and frequently such blow to the device or enclosure under test would be either too severe or not strong enough to dislodge any particles. If such blow was too severe, the device within the enclosure 37 might well be rendered useless. On the other hand, if the blow was insufficient to dislodge particles, the device under test could be identified as a good device and thereafter fail under field conditions.

Because of the difficulty in striking the proper blow to the device 37, the present invention provides a shock device or apparatus 52. It comprises an electromagnetic actuator 54 firmly mounted on the aforedescribed platform 22. Suitable hold-down apparatus such as mounting screws 56, mounting plate 58 and posts 60 may be employed to secure such actuator in place.

An armature or hammer 62 is provided on a triangularly-shaped spring member 64, the latter being secured to the aforedescribed posts 26 by means of mounting nuts 66.

Energization of the electromagnetic actuator 54 causes hammer or armature 62 to be attracted against the force of spring member 64. The hammer 62 is retained in this position until the circuit to the actuator 54 is interrupted, whereupon the spring 64 moves the hammer upwardly into engagement with anvil 36. Such engagement causes an abrupt mechanical shock to the support member 28 as well as the enclosure 37 mounted on the transducer 34. This mechanical shock to the enclosure 37 dislodges any foreign particles which are temporarily trapped or held in one place within such enclosure. Thereafter, the movement of such particle within the enclosure 37 creates noise which is picked up by the transducer 34 to transmit a signal to the aforedescribed visual and audible indicating devices.

Again, referring to FIG. 4 of the drawings, the block 68 identifies the power source for the electromagnetic actuator 54 such power being supplied thereto along the leads 70. A switch for activating the shock device 52 is shown in block 72 and comprises a normally open switch which is operable to energize a relay (not shown) having a pair of normally closed contacts in the energizing circuit for actuator 54. Thus, when it is desired to provide a mechanical shock to the enclosure 37, manual closure of the switch 72 energizes such relay so as to open its normally closed contacts thereby de-energizing the actuator 54.

Due to the high noise level at the transducer 34 in response to operation of shock device 52, the threshold detector 46 and the speaker shown with amplifier 42 are muted while the shock test is in progress. That is, as shown by lead lines 74 and 76, whenever the mechanical shock test is provided, the threshold detector and ultrasonic amplifier are rendered momentarily inoperative. Thereafter, and in response to the further shaking of the enclosure 37 as afforded by shaker 20, any particle loosened by the mechanical shock is indicated in the above-described manner.

With further reference to FIG. 4 of the drawings, a foot-operated switch is employed within the block 78. Such switch is for use in changing from one test enclosure 37 to another. That is, by depressing the foot switch 78, the operator causes the power supplied to the shaker 20 through electrical leads 80 to be interrupted and also causes the audio and visual indicating devices to be rendered inoperative as a result of an appropriate signal through leads 82, 84 and 86. Thus, when a new part 37 is to be mounted on transducer 34, the shaker is de-energized and the indicating devices are effectively disconnected from transducer 34.

It is thus seen that the present invention provides a particle detection system which is unique in enabling many enclosure devices to be quickly and accurately tested for any and all loose particles. Also, such devices are not over or under tested, and reliance is not placed upon human operators of the apparatus to provide the proper effective testing forces.

Although I have shown and described certain specific embodiments of my invention, I am well aware that many modifications thereof are possible. The claims appended hereto are not to be restricted except insofar as is necessitated by the prior art.

I claim:

1. A particle detector for determining the presence of a particle in a sealed enclosure comprising in combination,
    a platform adapted to mount on a vibrator,
    two or more support posts fixed to said platform in spaced relation thereon,
    a support member bridging said posts in spaced relation to said platform and adapted to receive an electronic amplifier connected in circuit with readout means,
    a transducer on said amplifier having connection therewith and to receive an enclosure,
    a spring member bridging said posts between said support member and said platform,
    an anvil secured to the underside of said support member and a hammer therefore secured to the topside of said spring member,
    and an electromagnetic actuator mounted on said platform and energizable to pull said hammer away from said anvil against the bias of said spring member and deenergizable to release said hammer to enable the bias of said spring member to move said hammer into engagement with said anvil.

2. A particle detector for determining the presence of a particle in a sealed enclosure according to claim 1, wherein three support posts are provided making a tripod support on said platform and said support member and spring member are each triangularly-shaped and fastened at three places to said posts.

3. A particle detector for determining the presence of a particle in a sealed enclosure according to claim 2, wherein said support member is shock mounted on each of said support posts.

4. A particle detector for determining the presence of a particle in a sealed enclosure according to claim 3, wherein said support posts are substantially equally spaced on said platform and said triangularly-shaped support and spring members are each substantially equilaterally shaped providing mounting corners individually attached to a separate one of said posts.

5. A particle detector for determining the presence of a particle in a sealed enclosure according to claim 4, wherein resilient grommets are used to mount the three mounting corners of said support member to the respective mounting posts.

6. A particle detector for determining the presence of a particle in a sealed enclosure according to claim 2, wherein said spring member is found of thin flexible material and said hammer is substantially centrally located thereon.

* * * * *